Figure 1:
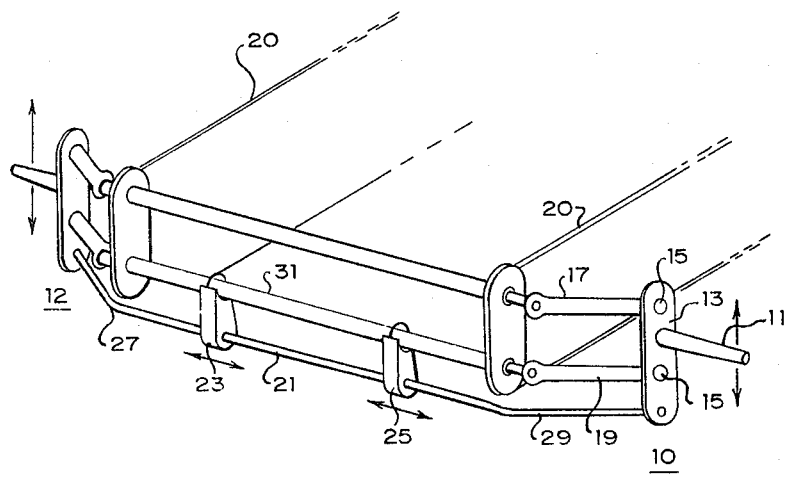

Aug. 30, 1966     C. O. FORGE     3,269,747

AUTOMOTIVE SUSPENSION SYSTEM

Original Filed May 20, 1964

INVENTOR.
CHARLES O. FORGE

BY    *a. C. Smith*

ATTORNEY

United States Patent Office 3,269,747
Patented August 30, 1966

3,269,747
AUTOMOTIVE SUSPENSION SYSTEM
Charles O. Forge, 20691 Homestead Road,
Cupertino, Calif.
Continuation of application Ser. No. 368,816, May 20,
1964. This application Mar. 9, 1966, Ser. No. 536,556
3 Claims. (Cl. 280—124)

This is a continuation application of pending application Serial Number 368,816, filed May 20, 1964, entitled Automotive Suspension System.

This invention relates to an automotive suspension system and more particularly to an anti-sway device which provides a variable amount of sway and roll correction.

Certain known anti-sway bars for automobiles are disposed between independently suspended axles, for example in the front end, to improve the ability of the automobile to corner at high speeds in a level attitude. These anti-sway bars typically respond to differential motion of the axles assemblies to impart to the axle assembly on one side a correcting force related to the vertical displacement of the axle assembly on the opposite side, thereby maintaining a relatively level attitude. In automobiles designed for use under competitive driving conditions, it is frequently desirable to use an anti-sway bar which provides a very high degree of sway and roll correction so that sharp turns may be achieved at high speed with only a negligible amount of sway or roll toward the outside radius of the turn. The same automobile, however, may be used under ordinary driving conditions where a stiff suspension and a high degree of roll or sway correction are not desirable. In automobiles which are used under such widely varying conditions, it is inconvenient to replace elements of the suspension system for each anticipated change of driving conditions.

Accordingly, it is an object of the present invention to provide an anti-sway bar which provides a variable amount of sway or roll correction.

It is another object of the present invention to provide anti-sway bar apparatus for the independently suspended axle assemblies of an automobile.

It is still another object of the present invention to provide adjustable sway and roll correction apparatus for the front end assembly of an automobile.

In accordance with the illustrated embodiment of the present invention an anti-sway bar is mounted in pivot blocks across the width of the automobile to transmit a correcting force from the axle assembly on one side to the axle assembly on the other side in response to the relative displacement of the axle assemblies from positions of level attitude. The pivot blocks are positionable on the frame of the automobile at selected positions along the bar in order to permit varying degrees of flexure along the length of the bar. Thus maximum separation of the pivot blocks yields maximum sway correction and cornering stiffness because negligible longitudinal flexure of the bar occurs. Spacing of the pivot blocks inwardly from the ends of the bar decreases the sway correction and cornering stiffness because the bar flexes along its length in response to relative displacement of the axle assemblies.

Figure 2:
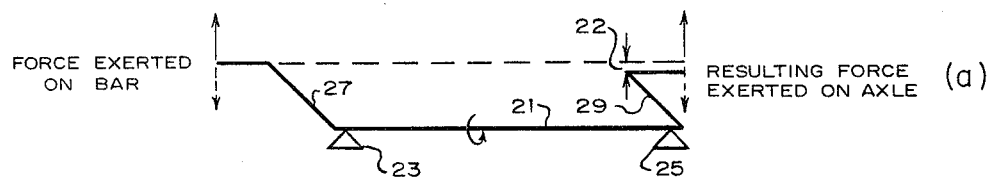
Figure 2:
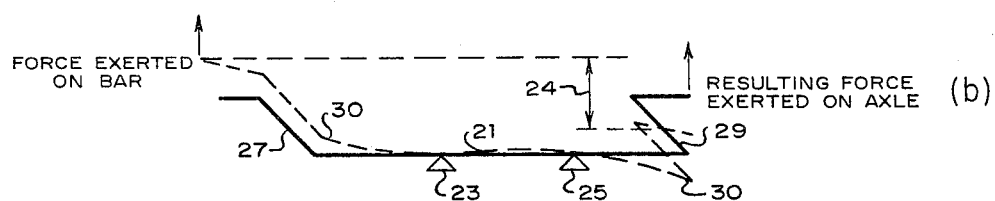

Other and incidental objects of the present invention will be apparent from a reading of this specification and an inspection of the accompanying drawing in which:

FIGURE 1 is a simplified perspective view of the front end suspension system of an automobile showing the anti-sway bar mounted in variably positionable pivot blocks across the width of the frame; and FIGURES 2a and b are physical diagrams showing the effect of the anti-sway bar mounted in variably positionable pivot blocks according to the present invention.

Referring now to FIGURE 1, there is shown an axle assembly 10 including axle 11 carried on link 13 which is disposed to pivot on bearings 15 at the ends of arms 17 and 19. Another identical axle assembly 12 is provided on the opposite side of frame 20. An anti-sway bar 21 is mounted in pivot blocks 23 and 25 across the width of the frame 20. The ends of the bar include lever arms 27 and 29 having selected lengths along a radius from the longitudinal axis of the bar. The ends of the lever arms 27, 29 are pivotally attached to the axle assembles on each side of the frame 20 as at the bottom of link 13 for converting the vertical differential displacement of the axle assemblies (for example, relative vertical movement upward on the left side) to a torsional force in the bar 21, as shown in FIGURE 2a. This torsional force in bar 21 is imparted to the axle assembly on the opposite side of frame 20 through the lever arm 27, 29 as a force tending to displace that axle assembly vertically, as shown in FIGURE 2a. Only a small relative displacement 22 of the ends of the bar results from the torsional twist of bar 21. With pivot blocks 23 and 25 maximally separated on frame 20, as shown schematically in FIGURE 2a, this vertical displacement force is related to the torsional force in bar 21 and hence to the vertical displacement of one axle assembly relative to the displacement of the other axle assembly. It should be understood that vertical displacement of both axle assemblies by equal amounts in the same direction produces no resultant torsional force in bar 21 since the bar 21 is adapted to correct only for differential displacements caused, for example, by high speed cornering.

With the pivot blocks 23 and 25 placed inwardly from the lever arms 27 and 29 as shown schematically in FIGURE 2b, vertical displacement of an axle assembly produces a torsional force as well as longitudinal flexure 30 in the bar 21. A large relative displacement 24 of the ends of the bar 21 results from the torsional twist and from the longitudinal flexure of the bar, as shown in FIGURE 2b. This has the effect of producing less sway-correcting force on one axle assembly for a given vertical displacement of the opposite axle assembly than is produced for the same vertical displacement of an axle assembly with the pivot blocks 23, 25 maximally spaced, as shown schematically in FIGURE 2a. Thus, the degree of sway correction provided by the anti-sway bar 21 mounted according to the present invention is determined by the dimensional separation of the pivot blocks 23 and 25 along the bar. A bar 21 selected to provide a high degree of sway correction for competitive driving conditions with the pivot blocks 23 and 25 maximally separated and disposed immediately adjacent the lever arms 27 and 29 may provide a lesser degree of sway correction for normal driving conditions merely by placing the pivot blocks 23 and 25 inwardly a selected distance from the lever arms 27 and 29. The pivot blocks 23 and 25 may be attached to a cross member 31 of the frame 20 using suitable clamps such as U-shaped bolts which are disposed around the cross member 31. Typical spacings of the pivot blocks 23 and 25 for varying sway correction may be any equal distances in from the ends of the bar 21 up to approximately one-quarter of the bar length, thereby leaving approximately one-half of the bar length between the pivot blocks unaffected by longitudinal flexure of the end portions.

I claim:
1. In a motor vehicle having a member which traverses at least a portion of the width of the vehicle and a pair of road wheel axles disposed at opposite sides of the vehicle, sway correction apparatus comprising:
 a pair of upper and lower support arms for each of said axles, each of said arms having forward and rearward ends;

means rotatably supporting the forward ends of each of the support arms about upper and lower transversely extending axes which are separated a selected distance in a plane defined by the axes;

axle carrier means supporting each of the axles on the rearward ends of upper and lower support arms at pivot points thereon which are separated by said selected distance for maintaining a parallel relationship between the plane defined by said axes and a line passing through the pivot points;

a bar disposed within said plane a predetermined distance away from one of the upper and lower axes and having longitudinal flexibility over a portion of its length near the ends thereof;

lever arms attached to the bar near each of the ends thereof and having other ends pivotally attached to the axle carrier means at said predetermined distance away from said one of upper and lower pivot points and at a point along the line passing through said pivot points for maintaining said support arms and lever arm parallel as the axle undergoes substantially vertical movement; and a pair of pivot blocks selectively positionable along said member adjacent the end portions of said bar having longitudinal flexibility to rotatably support said bar for producing in the end portions thereof a selected amount of longitudinal flexure within said plane defined by said axes in response only to differential vertical movement of said axles.

2. In a motor vehicle having a member which traverses at least a portion of the width of the vehicle and a pair of road wheels disposed at opposite sides of the vehicle, sway correction apparatus as in claim 1 wherein:

said bar is disposed within said plane a predetermined distance below the lower axis and has longitudinal flexibility over one quarter of its length from each end thereof;

the lengths of said lever arms are equal to the lengths of said support arms and said other ends of the lever arms are pivotally attached to the axle carrier means at said predetermined distance below said lower pivot points.

3. In a motor vehicle having a member which traverses at least a portion of the width of the vehicle and a pair of road wheels disposed at opposite sides of the vehicle, sway correction apparatus as in claim 1 wherein:

said upper and lower support arms and said lever arm on each side of the vehicle are of equal lengths and are arranged in parallel relationship.

References Cited by the Examiner
FOREIGN PATENTS 899,908  12/1953  Germany.

BENJAMIN HERSH, *Primary Examiner.*

M. S. SALES, *Assistant Examiner.*